United States Patent [19]
Kim

[11] Patent Number: 5,833,100
[45] Date of Patent: Nov. 10, 1998

[54] CELLULAR PHONE HOLDER

[76] Inventor: Dong-Joo Kim, No. 703 Daelim Apt 7-dong, 100 Eungbong-dong, Seongdong-ku, Seoul 133-080, Rep. of Korea

[21] Appl. No.: 743,981

[22] Filed: Nov. 21, 1996

[51] Int. Cl.[6] ....................................................... A45F 5/00
[52] U.S. Cl. ......................... 224/197; 224/272; 224/667; 224/930
[58] Field of Search .................................... 224/272, 930, 224/197–9, 666–8

[56] References Cited

U.S. PATENT DOCUMENTS

| | | | |
|---|---|---|---|
| 3,117,708 | 1/1964 | Goldman | 224/198 |
| 3,261,519 | 7/1966 | Horne | 224/198 |
| 3,956,701 | 5/1976 | James, Jr. et al. | 224/930 |
| 4,485,946 | 12/1984 | Liautaud et al. | 224/197 X |
| 4,667,374 | 5/1987 | Bianchi | 224/667 X |
| 4,801,011 | 1/1989 | Desdoigts et al. | 224/666 X |
| 5,620,120 | 4/1997 | Tien | 224/199 |

*Primary Examiner*—Renee S. Luebke
*Attorney, Agent, or Firm*—Levine & Mandelbaum

[57] ABSTRACT

A holder for cellular phones is disclosed. In the case of a case-separated holder, the holder of this invention has an elastic member and elastically holds a phone case, thus allowing a cased cellular phone to be easily and simply handled by one hand when the phone is held on or removed from the holder. The above case-separated holder also limits the rotating angle of the cased cellular phone relative to the holder, thus preventing a sudden separation of the cellular phone from the phone case. In the case of a case-integrated holder, the holder has a means for limiting the rotating angle of a phone case relative to the holder, thus allowing the phone case to be rotated freely or within a limited angle relative to the holder. The case-integrated holder thus prevents the cased cellular phone from pressing a part of a user's body when a user sits on a chair, and prevents the holder from being deformed by a tensile force.

2 Claims, 11 Drawing Sheets

FIG, 2 (PRIOR ART)

CELLULAR PHONE HOLDER

BACKGROUND OF THE INVENTION

1. Field of the Invention

The present invention relates, in general, to a holder for cellular phones or radio pagers and, more particularly, to a structural improvement in such a holder for elastically holding a phone case on a case-separated holder clipped on a user's belt thus allowing a cased cellular phone to be easily and simply handled by one hand when the phone is held on or removed from the case-separated holder, and for preventing a cased cellular phone held on a user's belt by a case-integrated holder from pressing a part of a user's body, and preventing the case-integrated holder from being deformed.

2. Description of the Prior Art

Cellular phones, which are widely used in accordance with development of communications instruments, are generally classified into two types, that is, digital and analog cellular phones. Each of the above cellular phones is used while being received in a phone case, which is holed in order to form a plurality of holes on the portions corresponding to the receiver and transmitter parts of the cellular phone.

In order to simply carry the cellular phones, the cellular phones received in the cases are held on the belts of users. In order to hold the cellular phones on the belts, two types of holders, that is, case-integrated holders and case-separated holders, are used. A typical case-integrated holder (hereinbelow, referred to simply as "integrated holder") is fixed to the back surface of the phone case and is clipped on a user's belt in order to hold the cased cellular phone on the belt. Meanwhile, a typical case-separated holder (hereinbelow, referred to simply as "separated holder") is produced separately from the phone case and is clipped on a user's belt, and is detachably coupled to the case in order to hold the cased cellular phone on the belt.

FIG. 1 is an exploded perspective view showing the construction and operation of a typical separated holder for cellular phones. As shown in FIG. 1, the separated holder 11 detachably holds a case 2 which receives a cellular phone 1 therein and is provided with a holding button 8 on its back surface. The above holder 11 comprises a base panel 12 which is provided with a clip 12 on its back surface. A cover member 16 is fixedly mounted to the front surface of the above base panel 12. The above cover member 16 is provided with a button holder 18 which is vertically slitted to a length in order to form a U-shaped slit 19. The holder 11 also includes a locker 14 and a hook pin 15. The above hook pin 15 is provided in the U-shaped slit 19 and is operated by the locker 14 in order to lock or release the holding button 8 received in the U-shaped slit 19. The above locker 14 is movably placed between the base panel 12 and the cover 16.

In order to hold the cased cellular phone 1 on the holder 11, the holding button 8 of the case 2 is received into the U-shaped slit 19 of the holder 11 clipped on the belt. In order to use the cased cellular phone 11, the cased cellular phone 1 is removed from the holder 11 by pulling up the phone 1 from the holder 11 using one hand after the locker 14 of the holder 11 is pushed down by the other hand in order to release the holding button 8 of the case 2 from the hook pin 15 of the holder 11. That is, in order to remove the cased cellular phone 1 from the holder 11, both hands of a user must handle the cased cellular phone 1 and the locker 14 of the holder 11, respectively. Therefore, the above holder 11 has a problem in that it is very difficult to remove the cased cellular phone 1 from the holder 11 when the user handles a steering wheel while driving or holds something, such as a bag, by one hand.

The above holder 11 allows the cased cellular phone 1 to be freely rotated at an angle of 360° relative to the holder 11, so that the cellular phone 1 may be separated from the case 2 and be damaged when the cover 4 of the case 2 is opened or the velcro 3 of the cover 4 is not fastened.

FIG. 2 is a side view showing the construction of a typical integrated holder. As shown in FIG. 2, the integrated holder 11' comprises a clip, which is fixed to the back surface of the phone case 2'. In order to hold the cased cellular phone 1 on a user's belt, the case 2' integrated with the holder 11' is clipped on the belt. In order to use the cased cellular phone 1, the case 2', which receives the cellular phone 1, is removed from the belt by pulling up the case 2' from the belt. The above case 2' integrated with the holder 11' does not rotate relative to the holder 11', so that the cased cellular phone 1 presses a part of a user's body when the user with the phone 1 clipped on one's belt seats on a chair. In addition, the cased cellular phone 1 in the above state causes the portion between the holder 11' and the user's belt to be overloaded and tensioned, thereby causing the holder 11' to be permanently deformed or causing the user's belt to be torn.

SUMMARY OF THE INVENTION

It is, therefore, a primary object of the present invention to provide a holder for cellular phones in which the above problems caused by the typical separated holders can be overcome and which is formed into a separated holder provided with an elastic member and elastically holds a phone case by the elastic member thus allowing a cased cellular phone to be easily and simply held on or removed from the holder by one hand.

It is another object of the present invention to provide a holder for cellular phones in which the above problems caused by the typical integrated holders can be overcome and which is formed into an integrated holder provided with a means for limiting the rotating angle of a phone case relative to the holder, thus allowing the phone case to be rotated freely or within a limited angle relative to the holder and thereby not only preventing the cased cellular phone from pressing a part of a user's body when a user seats on a chair but also preventing the holder from being deformed by a tensile force.

In order to accomplish the above primary object, the present invention provides a holder for cellular phones comprising a base panel provided with a clip for clipping the holder on a user's belt, and a cover member mounted to the base panel and provided with a button holder, the button holder being vertically slitted to a length in order to form a U-shaped slit for receiving a holding button of a phone case thereby holding a cased cellular phone, further comprising: an opening formed on the cover member at a position corresponding to the U-shaped slit of the button holder; and an elastic member placed between the base panel and the cover member in a way such that a part of the elastic member normally elastically protrudes out of the opening of the cover member and selectively retracts into the opening when the elastic member is biased by the holding button.

In order to accomplish the second object, the present invention provides a holder for cellular phones comprising: a fixing plate fixed inside a phone case; a holding plate attached outside the phone case at a position corresponding to the fixing plate, the holding plate being provided with a clip for clipping the phone case on a user's belt and having a multi-stage opening on a center position thereof; a circular rotating button fixed outside the phone case and rotatably received in the multi-stage opening of the holding plate; and a coupling pin adapted for coupling the fixing plate, phone case, holding plate and circular rotating button together in a way such that the rotating button along with the phone case is rotatable relative to the holding plate provided with the clip.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
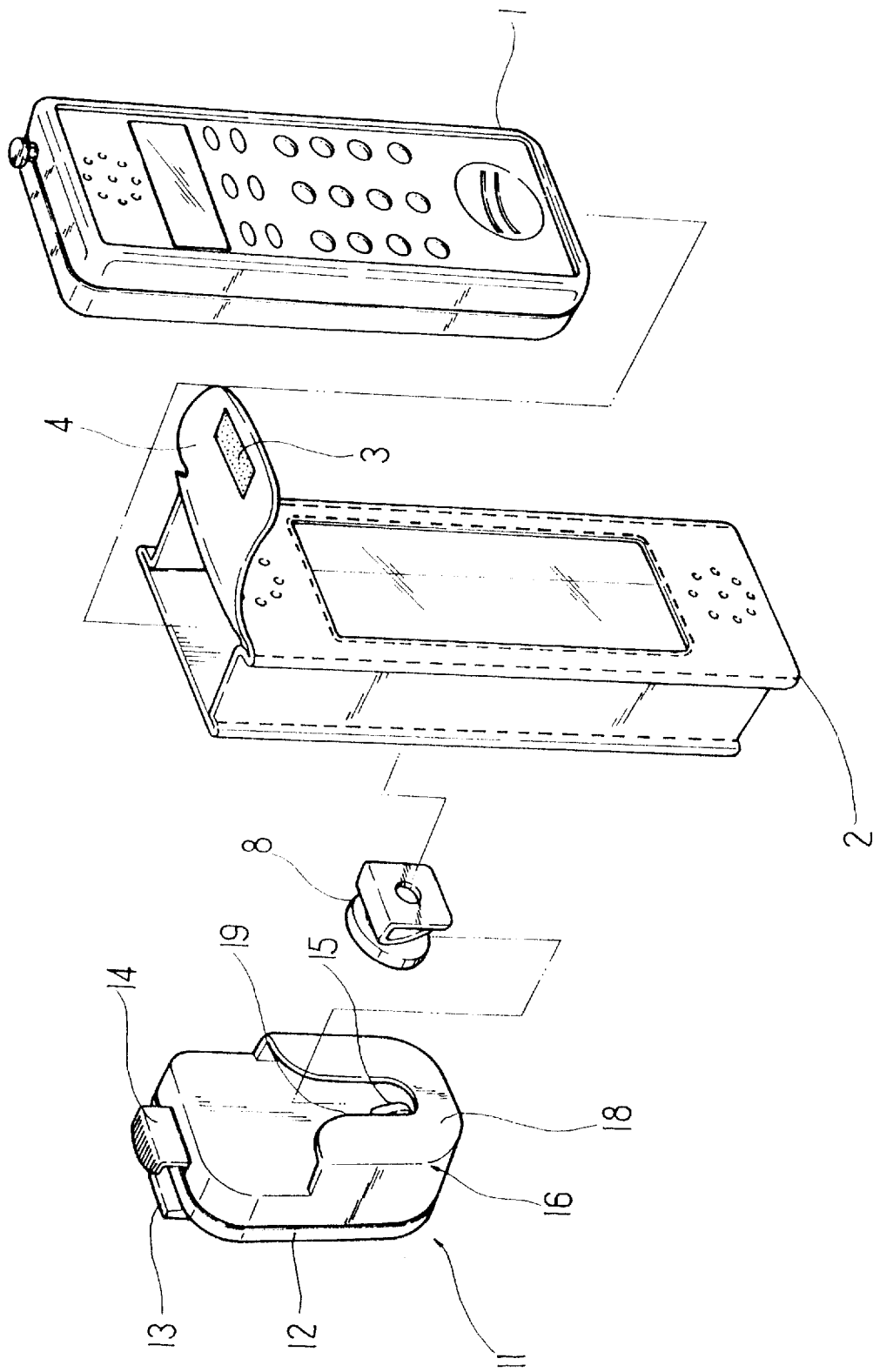
FIG. 1 is an exploded perspective view showing the construction and operation of a typical separated holder for cellular phones.
Figure 2:
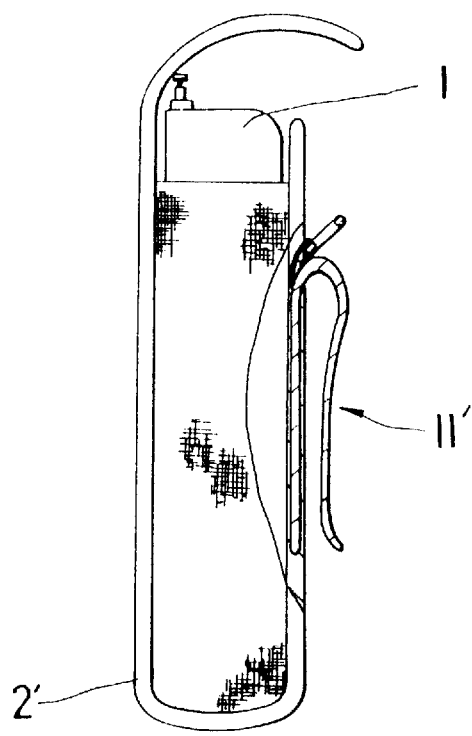
FIG. 2 is a side view showing the construction of a typical integrated holder for cellular phones.
Figure 3:
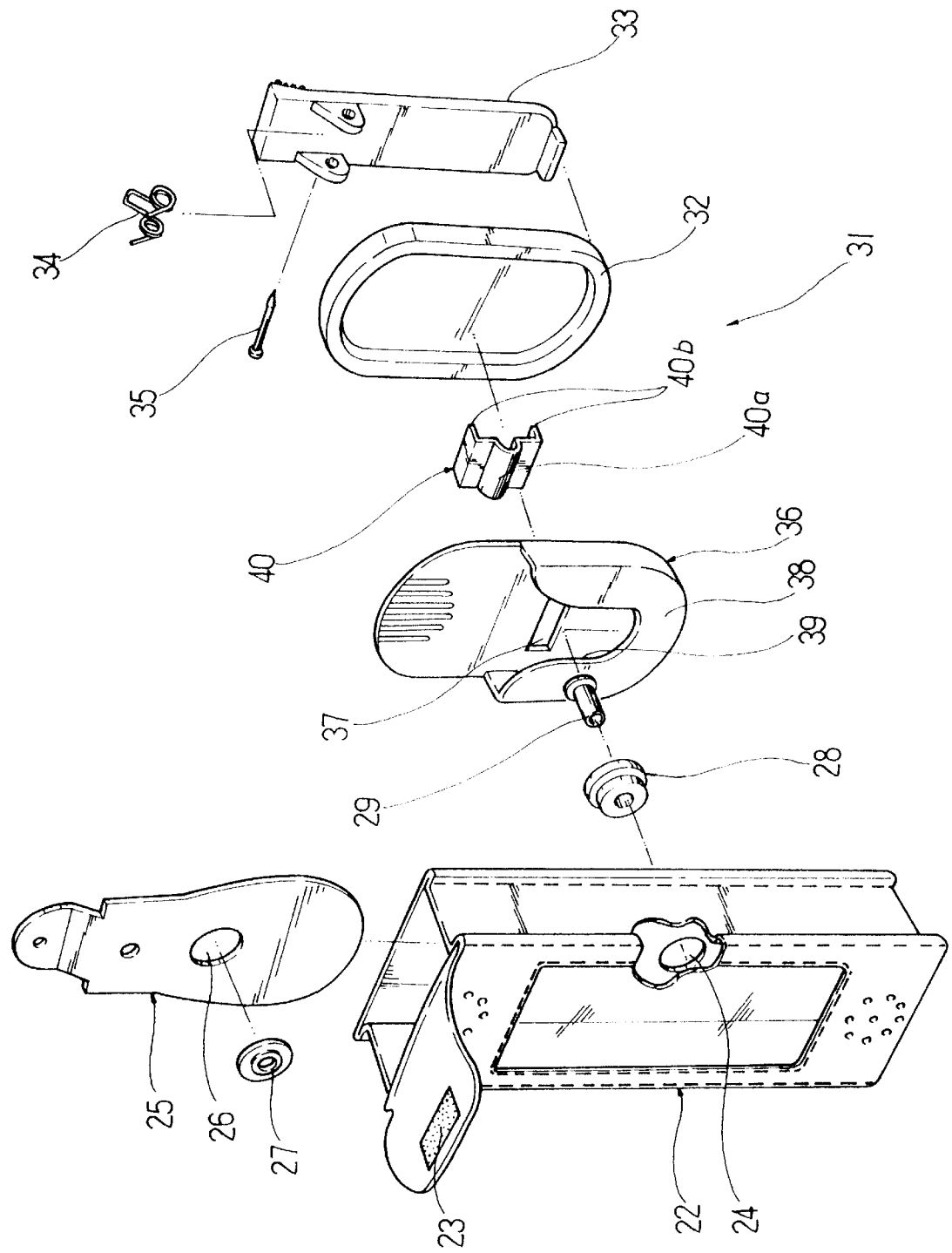
FIG. 3 is an exploded perspective, view showing the construction of a separated holder for cellular phones in accordance with a primary embodiment of the present invention.
Figure 4:
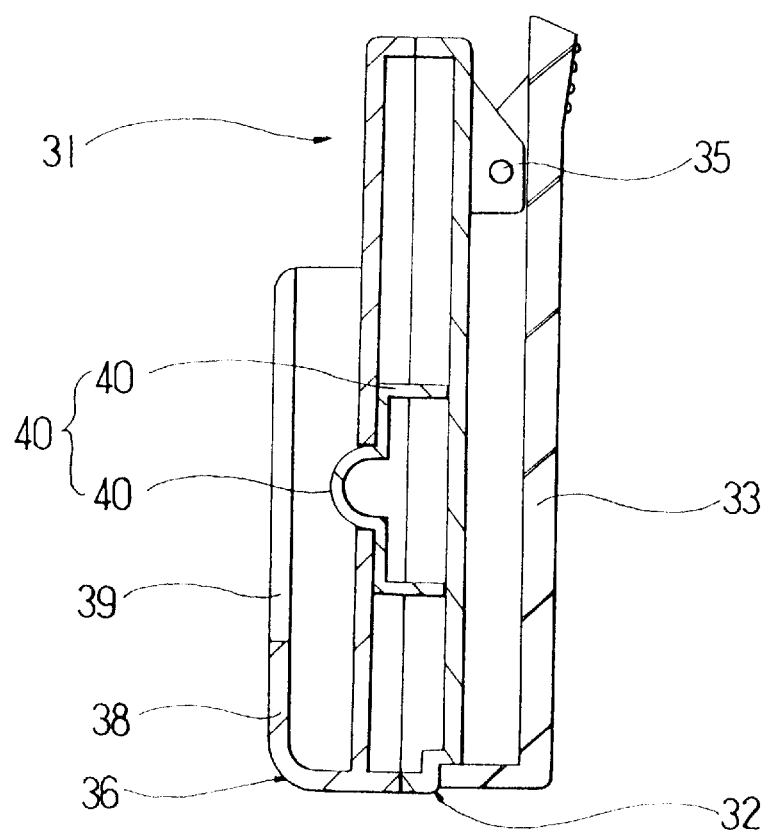
FIG. 4 is a side sectional view of the assembled holder of FIG. 3.

FIGS. 3 and 4 are views showing the construction of a separated holder for cellular phones in accordance with a primary embodiment of the present invention. As shown in FIGS. 3 and 4, a circular coupling hole 24 is formed on the phone case 22. A fixing plate 25, a washer 27 and a holding button 28 are mounted to the coupling hole 24 of the phone case 22 by a coupling pin 29. The above fixing plate 25, which is provided with a circular hole 26, and the washer 27, which is brought into contact with the fixing plate 25, are arranged inside the case 22. Meanwhile, the button 28 is arranged outside the case 22.

The holder 31, which is brought into detachable engagement with the holding button 28 of the case 22 in order to hold the case 22, comprises two parts, that is, a base panel 32 and a cover member 36. A spring-biased clip 33 is coupled to the base panel 32 by a hinge pin 35, so that the holder 31 is clipped on a user's belt. The above clip 33 is biased by a torsion spring 34, which is fitted over the hinge pin 35. The above cover member 36 is provided with a horizontal opening 37 on its center portion. The above opening 37 has a rectangular shape. The cover member 36 is provided with a button holder 38, which is vertically slitted to a length in order to form a U-shaped slit 39. The mouth and lower end of the above slit 39 are rounded in order to allow the holding button 28 to be smoothly inserted into the slit 39 and to allow the button 28 to be seated in the rounded lower end of the slit 39.

An elastic member 40 is interposed between the base panel 32 and the cover member 36 at a portion corresponding to the horizontal opening 37 of the cover member 36. The above elastic member 40 comprises a base part 40b and a protrusion part 40a. The base part 40b of the elastic member 40 is elastically held in the space defined between the base panel 32 and the cover member 36, while the protrusion part 40a is provided on the center of the above base part 40b and protrudes out of the horizontal opening 37 of the cover member 36 toward the U-shaped slit 39.

In operation of the above holder 31, the holder 31 is clipped on a user's belt by the clip 33, while the cased cellular phone is held on or removed from the holder 31 by receiving or removing the holding button 28 of the case 22 into or from the U-shaped slit 39 of the holder 31. That is, the cased cellular phone, which is held by one hand of a user, is held on the holder 31 by receiving the holding button 28 of the case 22 into the U-shaped slit 39 of the holder 31. In the above state, the holding button 28 smoothly moves down under the guide of the U-shaped slit 39 and in turn comes into contact with the protrusion part 40a of the elastic member 40. When the cased cellular phone in the above state is further pushed down, the holding button 28 presses the protrusion part 40a in order to elastically retract the protrusion part 40a into the horizontal opening 37 of the cover member 36, so that the holding button 28 passes by the protrusion part 40a. When the holding button 28 passes over the protrusion part 40a and reaches the rounded lower end of the U-shaped slit 39, the protrusion part 40a elastically returns to its original position and stops the holding button 28 received in the lower end of the U-shaped slit 39. The cased cellular phone in the above state is prevented from being suddenly removed from the holder 31.

In order to remove the cased cellular phone from the holder 31, the cased cellular phone is pushed up from the holder 31 by one hand, so that the cased cellular phone is simply removed from the holder 31 while retracting the protrusion part 40a of the elastic member 40 into the opening 37.

In accordance with the above holder 31, the cellular phone received in the phone case 22 is simply held on or removed from the holder 31 clipped on a user's belt by pushing down or up the holding button 28 of the case 22 relative to the U-shaped slit 39 of the holder 31 provided with the elastic member 40. Therefore, the above holder 31 allows a user to easily hold or remove the cased cellular phone on or from the holder 31 and to use the phone even when the user handles a steering wheel while driving a car or holds something, such as a bag, by one hand.

Figure 5:
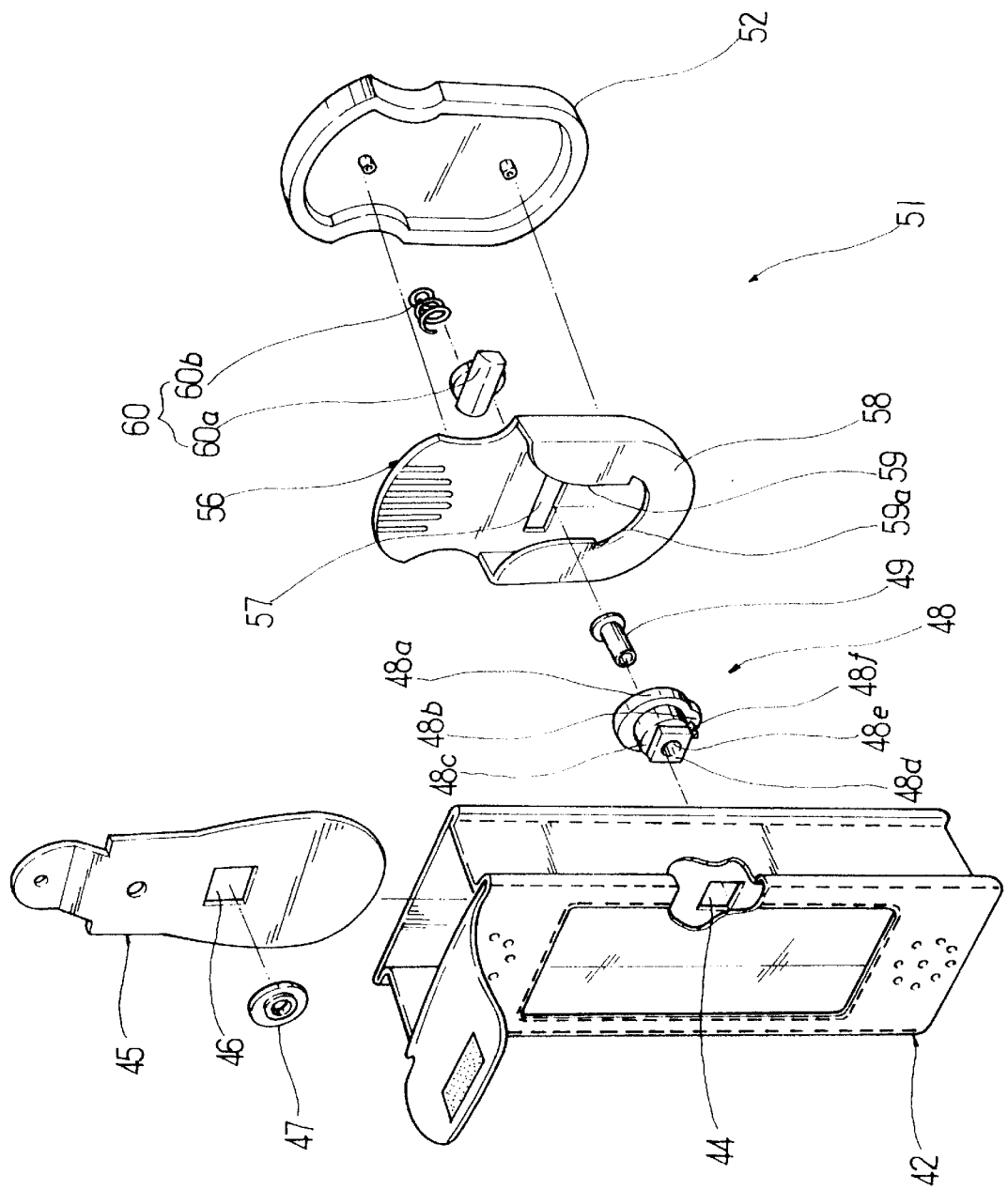
FIG. 5 is an exploded perspective view showing the construction of a separated holder for cellular phones in accordance with another embodiment of the present invention.
Figure 6:
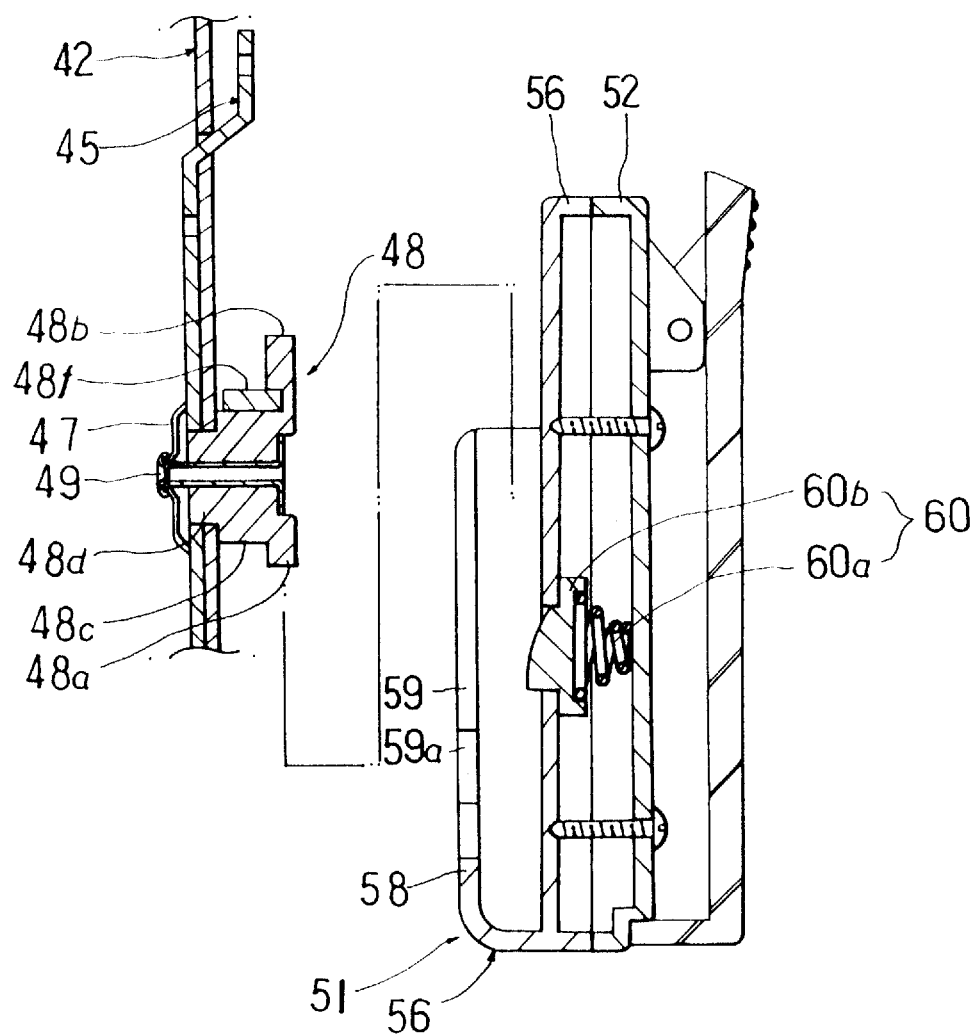
FIG. 6 is a side sectional view of the assembled holder of FIG. 5.

FIGS. 5 and 6 are views showing the construction of a separated holder for cellular phones in accordance with a second embodiment of the present invention. As shown in FIGS. 5 and 6, a rectangular coupling hole 44 is formed on the phone case 42. A fixing plate 45, a washer 47 and a holding button 48 are mounted to the coupling hole 44 of the phone case 42 by a coupling pin 49. The above fixing plate 25, which is provided with a rectangular hole 46, and the washer 47, which is brought into contact with the fixing plate 45, are arranged inside the case 42. Meanwhile, the button 48 is arranged outside the case 42. The above button 48 comprises a disc part 48a. The disc part 48a has a diameter of larger than the width of a U-shaped slit 59 of the holder 51, which will be described later herein, in order to be hooked by the U-shaped slit 59. The above disc part 48a is provided with a push protrusion 48b, which protrudes from the circumferential surface of the disc part 48a. A cylindrical guide part 48c is integrated with the disc part 48a into a single body. The above guide part 48c smoothly moves down or up under the guide of the U-shaped slit 59 of the holder 51 when the holding button 48 is received into or removed from the holder 51. A rectangular fixing protrusion part 48d is integrated with the above cylindrical guide part 48c into a single structure. The above protrusion part 48d is mounted to the coupling hole 44 of the case 42 inside the case 42, thereby fixing the holding button 48 to the case 42. A metal stop pin 48f is fixed to the disc part 48a at a portion outside the guide part 48c and extends toward the case 42.

The above holder 51, which is brought into detachable engagement with the holding button 48 of the case 42 in order to hold the case 42, comprises two parts, that is, a base panel 52 and a cover member 56. A clip is coupled to the base panel 52 in the same manner as described for the primary embodiment, so that the holder 51 is clipped on a user's belt. The above cover member 56 is provided with a rectangular horizontal opening 57 on its center portion. The cover member 56 is also provided with a button holder 58, which is vertically slitted to a length in order to form a U-shaped slit 59. The rounded lower end portion of the above U-shaped slit 59 is cut out in order to form an arcuate space 59a, which is provided with stop shoulders on its opposite ends. The stop shoulders of the arcuate space 59a stop the stop pin 48f of the holding button 48 when the button 48 of the case 42 is rotated relative to the holder 51. The above stop shoulders of the arcuate space 59a thus limit the rotating angle of the button 48 relative to the holder 51.

In addition, an elastic member 60 is arranged in the space defined between the base panel 52 and the cover member 56. The above elastic member 60 comprises a protrusion 60a and a compression coil spring 60b. The above protrusion 60a is received in the horizontal opening 57 of the holder 51 and is biased by the compression coil spring 60b toward the U-shaped slit 59, so that the protrusion 60a normally protrudes out of the horizontal opening 57. The above base panel 52 and cover member 56 with the elastic member 60 are assembled into a single body by a plurality of set screws (not shown).

In operation of the above holder 51, the holder 51 is clipped on a user's belt by the clip, while the cased cellular phone is held on or removed from the holder 51 by receiving or removing the holding button 48 of the case 42 into or from the U-shaped slit 59 of the holder 51 in the same manner as described for the primary embodiment. That is, the holding button 48 moves down under the guide of the U-shaped slit 59 and in turn comes into contact with the protrusion 60a of the elastic member 60. When the cased cellular phone in the above state is further pushed down, the holding button 48 presses the protrusion 60a in order to retract the protrusion 60a into the horizontal opening 57 of the cover member 56, so that the holding button 48 elastically passes by the protrusion part 40a. When the holding button 48 passes over the protrusion 60a and reaches the rounded lower end of the U-shaped slit 59, the protrusion 60a elastically returns to its original position and stops the holding button 48 received in the lower end of the U-shaped slit 59.

In accordance with the above holder 51, the cellular phone received in the phone case 42 is simply held on or removed from the holder 51 clipped on a user's belt by pushing down or up the holding button 48 of the case 42 relative to the U-shaped slit 59 of the holder 51 provided with the elastic member 60. Therefore, the above holder 51 allows a user to easily hold or remove the cased cellular phone on or from the holder 51 and to use the phone even when the user handles a steering wheel while driving a car or holds something, such as a bag, by one hand.

Figure 7:
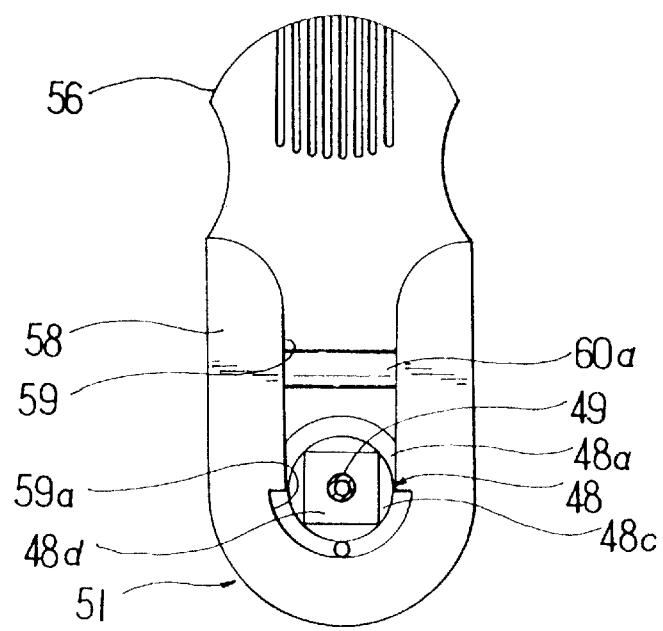
FIGS. 7 and 8 are front views showing the operation of the separated holder of FIG. 5 while limiting the rotating angle of the case relative to the holder to a predetermined angle.
Figure 8:
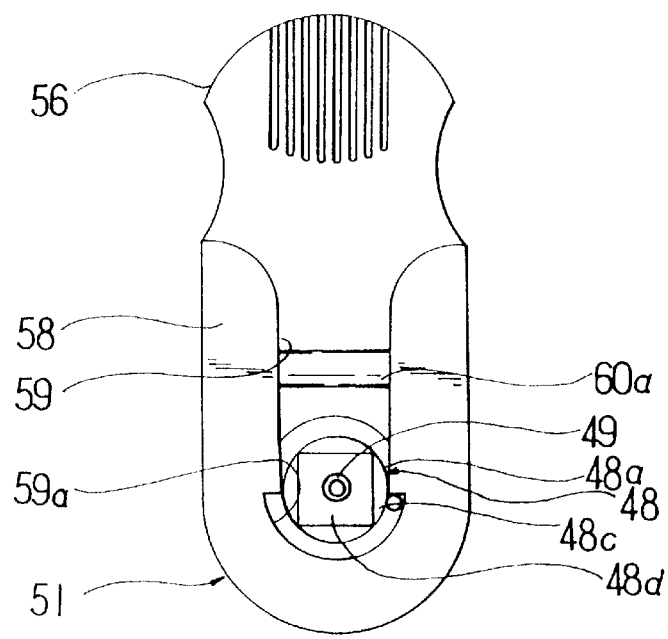

The cased cellular phone, which is held on the above holder 51 by the holding button 48 received in the U-shaped slit 57 of the holder 51, may be rotated relative to the holder 51 by its own weight or by a user who sits on a chair. In accordance with the above holder 51, the rotating angle of the cased cellular phone is limited as follows. That is, the stop pin 48f of the holding button 48 is stopped by either of the two stop shoulder of the arcuate space 59a of the U-shaped slit 59 when the holding button 48 fixed to the case 42 is rotated relative to the holder 51 at a predetermined angle. Therefore, the rotating angle of the holding button 48 relative to the holder 51 is limited to the above predetermined angle. For example, the stop shoulders of the arcuate space 59a of the holder 51 shown in FIGS. 7 and 8 are spaced apart from each other at an angle of 180°, so that the stop pin 48f of the holding button 48 is stopped by the stop shoulders when the stop pin 48f is rotated from the bottom center of the arcuate space 59a in opposite directions at an angle of 90°. Therefore, the opposite rotating angles of the cased cellular phone relative to the holder 51 of FIGS. 7 and 8 are limited to an angle of 90°.

The above holder 51 limits the rotating angle of the cased cellular phone by the stop pin 48f of the holding button 48 cooperating with the stop shoulders of the arcuate space 59a formed in the holder 51 as described above, so that the holder 51 prevents the cased cellular phone from being excessively rotated relative to the holder 51 thus preventing a sudden removal of the cellular phone from the case 42 and preventing any damaging of the phone.

Figure 9:
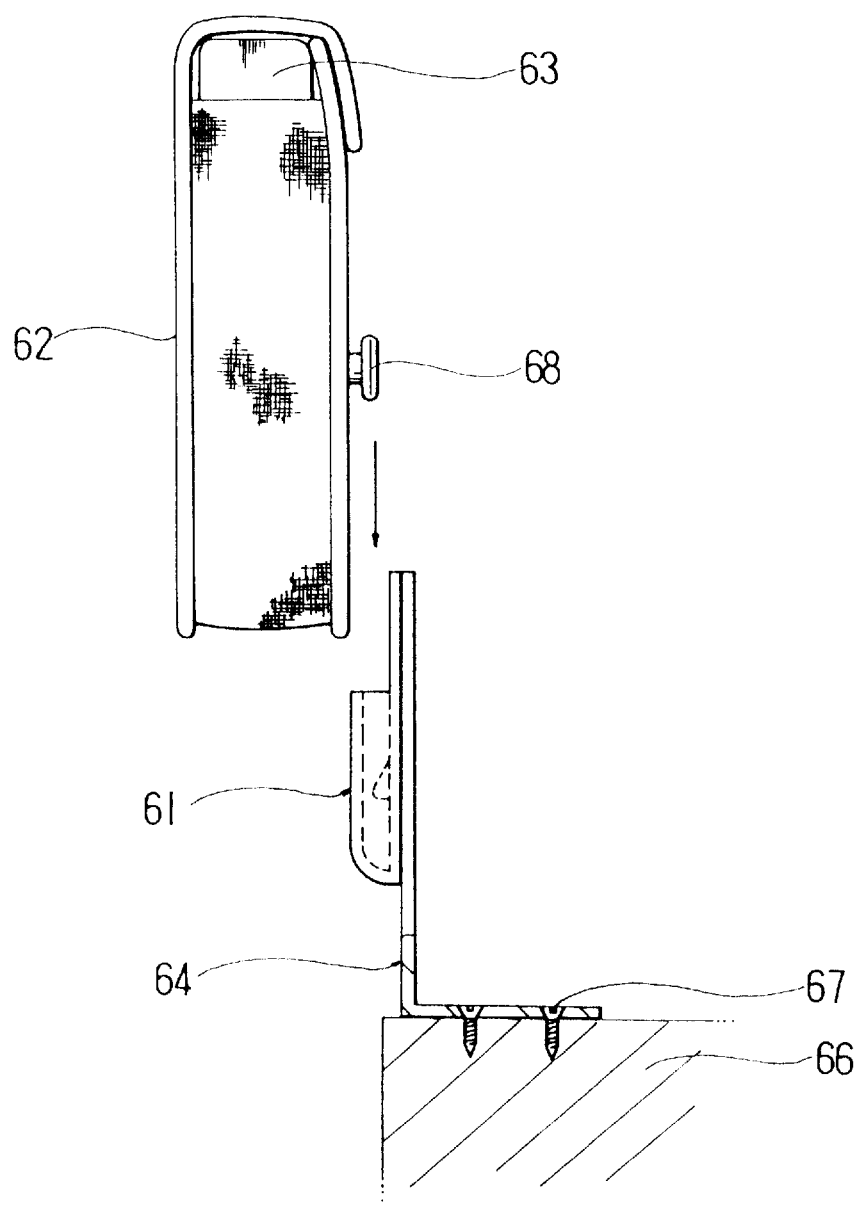
FIG. 9 is an exploded side view showing the construction of a separated holder installed inside a car in accordance with a further embodiment of the present invention.

The separated holder, according to this invention, may be installed inside a car in order to easily and stably hold a cellular phone while driving a car as shown in FIG. 9. In the third embodiment of FIG. 9, the base portion of an L-shaped holder bracket 64 is mounted to an appropriate portion 66 inside a car by a plurality of set screws 67. The back surface of a separated holder 61 is fixed to the holder mount portion of the above holder bracket 64. While driving the car, the cased cellular phone is removed from a holder attached to a user's belt and in turn is held on the above holder 61 by receiving the holding button 68 of the case 62 into the holder 61.

In accordance with the above holder 61 of FIG. 9, it is possible to overcome the problems caused by the cellular phone 63 while driving a car. The above holder 61 also allows a user to easily use the cellular phone 63 while driving a car. In this regard, the holder 61 is more convenient to a user while driving in comparison with the other holders clipped on a user's belt.

In addition, it should be understood that the holder mount portion of the above holder bracket 64 may be vertically slitted in order to form a U-shaped slit. The above holder bracket 64 provided with the U-shaped slit is effectively used in place of the holder provided with a U-shaped slit.

Figure 10:
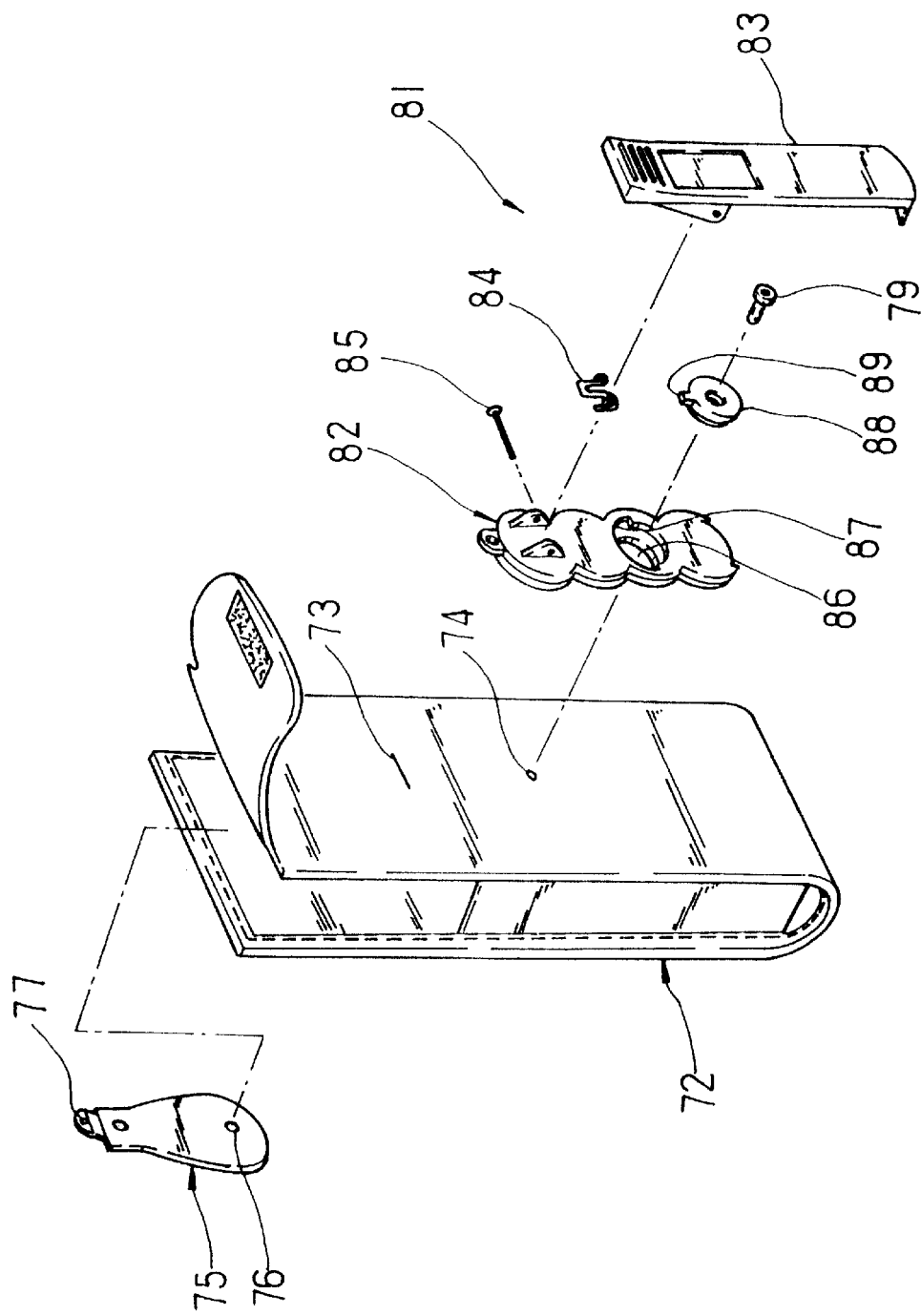
FIG. 10 is an exploded perspective view showing the construction of an integrated holder for cellular phones in accordance with still another embodiment of the present invention.

FIG. 10 is an exploded perspective view showing the construction of an integrated holder for cellular phones in accordance with the fourth embodiment of the present invention. In the embodiment of FIG. 10, the phone case 72 is provided with a small hole 74 and a horizontal slit 73, which are formed on the same wall of the case 72. The above small hole 74 is formed at the center of a wall of the case 72, while the slit 73 is positioned above the small hole 74. A fixing plate 75, which is provided with a coupling hole 76 corresponding to the small hole 74 of the case 72, is mounted to the hole 74 inside the case 72. The top portion of the above fixing plate 75 passes through the horizontal slit 73 and protrudes out of the above slit 73. The plate's top portion, which protrudes out of the slit 73, has a hole 77 used for connecting a string to the plate 75.

A holding plate 82 is mounted to the case's small hole 74 outside the case 72, so that the position of the holding plate 82 is opposed to the position of the fixing plate 75. The above holding plate 82 has a multi-stage opening 86, which corresponds to the small hole 74 of the case 72. The outer edge of the above multi-stage opening 86 is partially cut out in order to form an arcuate space 87, which is used as a means for limiting the rotating angle of the cased cellular phone relative to the holder 81.

A circular rotating button 88, which has a center hole, is rotatably inserted in the multi-stage opening 86 of the holding plate 82. The circular button 88 is provided with a radial protrusion 89, which radially extends from the circumferential surface of the button 88. The above radial protrusion 89 is received in the arcuate guide space 87 and is stopped by the opposite ends of the guide space 87 when the button 88 is rotated inside the multi-stage opening 86, so that the rotating angle of the button 88 inside the multi-stage opening 86 is limited to a predetermined angle. That is, the radial protrusion 89 and the arcuate guide space 87 cooperate with each other in order to limit the rotating angle of the cased cellular phone relative to the holder 81.

The above button 88, holding plate 82, phone case 72, and fixing plate 75 are coupled together by a coupling pin 79, which passes through the holes of the above button 88, holding plate 82, phone case 72, and fixing plate 75, so that the phone case 72 can be rotated relative to the holder 81 at a predetermined angle limited by the rotating angle limiting means. In order to clip the above integrated holder 81 on a user's belt, a spring-biased clip 83 is hinged to the top end portion of the holding plate 82 by a hinge pin 85. The above hinge pin 85 is biased by a torsion spring 84, so that the clip 83 is provided with elasticity.

Figure 11:
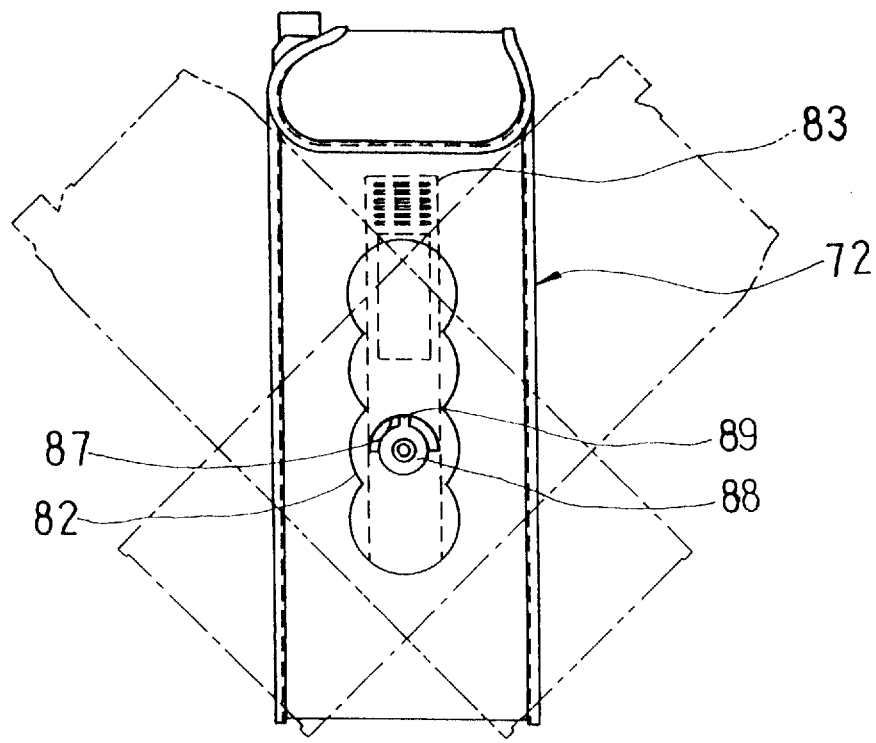
FIG. 11 is a front view showing the operation of the integrated holder of FIG. 10 while limiting the rotating angle of the case relative to the holder to a predetermined angle.

In operation of the above integrated holder 81, the guide protrusion 89 of the button 88 moves inside the arcuate guide space 87 of the holding plate 86, when the case 72 is rotated relative to the holder 81. As shown in FIG. 11, the opposite ends or stop shoulders of the guide space 87 are spaced apart from each other at an angle of 180°, so that the guide protrusion 89 of the button 88 is stopped by the opposite ends of the guide space 87 when the guide protrusion 89 is rotated from the middle portion of the guide space 87 in opposite directions at an angle of 90°. Therefore, the opposite rotating angles of the cased cellular phone relative to the holder 81 clipped on a user's belt are limited to an angle of 90°.

Alternatively, the opposite ends or stop shoulders of the arcuate guide space 87 may be spaced apart from each other at an angle of 90°. In the above case, the guide protrusion 89 of the button 88 is stopped by the opposite ends of the guide space 87 when the guide protrusion 89 is rotated from the middle portion of the guide space 87 in opposite directions at an angle of 45°. In the above holder, the opposite rotating angles of the cased cellular phone relative to the holder 81 clipped on a user's belt are limited to an angle of 45°. That is, the angle formed between the opposite ends of the guide space 87 may be freely set within an angle of 90°, which effectively prevents a sudden separation of the cellular phone from the case by its own weight.

The above integrated holder 81 allows the cased cellular phone to be rotated in opposite directions at an angle within 90° relative to the holder 81 attached to a user's belt, so that the holder 81 prevents the cased cellular phone from pressing a part of a user's body and prevents the holder 81 from being tensioned and breaking down when a user sits on a chair. The above holder 81 also limits the rotating angle of the cased cellular phone by the above-mentioned rotating angle limiting means, so that the holder 81 prevents the cased cellular phone from being excessively rotated relative to the holder 81 thus preventing a sudden removal of the cellular phone from the case 72 and preventing any damage of the phone.

Figure 12:
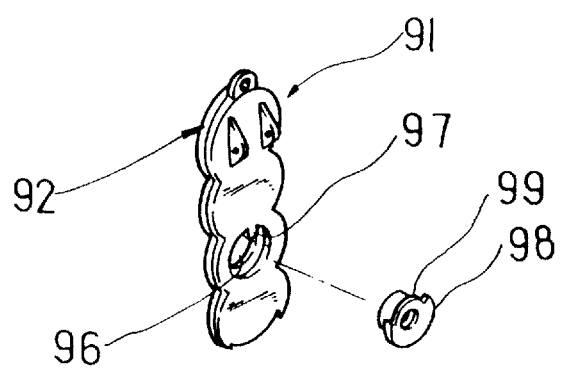
FIG. 12 is an exploded perspective view showing the construction of an integrated holder for cellular phones in accordance with still another embodiment of the present invention.

FIG. 12 is an exploded perspective view showing the construction of an integrated holder for cellular phones in accordance with the fifth embodiment of the present invention. In the above embodiment, the rotating angle limiting means of the holder 91 comprises a guide protrusion 97, which radially extends inward from the edge of the opening 96 of the holding plate 92. The above rotating angle limiting means also includes a circular rotating button 98, which has a diameter of slightly smaller than that of the opening 96 and is rotatably received in the opening 96 of the holding plate 92. The edge of the above button 98 is cut out in order to form an arcuate guide notch 99. The opposite ends of the above guide notch 99 are spaced apart from each other at a predetermined angle and are used as stop shoulders, which are stopped by the guide protrusion 97 of the opening 96 when the button 98 is rotated inside the opening 96 of the holding plate 92. The holder 91 of FIG. 12 yields the same result as described for the fourth embodiment of FIGS. 10 and 11.

Figure 13:
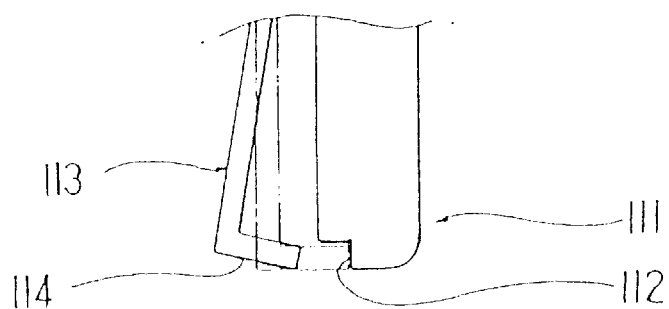
FIG. 13 is a side view showing the construction of a holder for cellular phones suitable for being more tightly clipped on a user's belt in accordance with still another embodiment of the present invention.

FIG. 13 is a side view showing the construction of a holder for cellular phones suitable for being more tightly clipped on a user's belt in accordance with still another embodiment of the present invention. In the above embodiment, the lower edge of the holder 111 is provided with a slot 112. The above slot 112 is formed on a position corresponding to the stop end 114 of a spring-biased clip 113 and has a configuration suitable for receiving the stop end 114. The above stop end 114 is formed by bending the lower end of the clip 113 toward a phone case. Due to the slot 112 and stop end 114, the above holder 111 is almost completely prevented from being suddenly separated from a user's belt, thereby preventing the loss or damage of the cellular phone.

As described above, the present invention provides a holder for cellular phones, which effectively overcomes the problems caused by the typical case-separated or case-integrated holders. When the invention is adapted to a case-separated holder, the holder is provided with an elastic member and elastically holds a phone case by the elastic member thus allowing a cased cellular phone to be easily and simply handled by one hand when the phone is held on or removed from the holder. In this regard, the case-separated holder of this invention allows the user to easily and simply handle the cased cellular phone particularly when driving a car or holding a something, such as a bag, by one hand. In addition, the case-separated holder of this invention limits the rotating angle of the cased cellular phone relative to the holder to a predetermined angle, thus preventing a sudden separation of the cellular phone from the phone case and preventing the damage or loss of the cellular phone. Meanwhile, when the invention is adapted to a case-integrated holder, the holder is provided with a means for limiting the rotating angle of a phone case relative to the holder, thus allowing the phone case to be rotated freely or within a limited angle relative to the holder and thereby not only preventing the cased cellular phone from pressing a part of a user's body when a user sits on a chair but also preventing the holder from being deformed by a tensile force. The holder of this invention is thus convenient to a user.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the present invention may be adapted to a holder for radio pagers.

What is claimed is:

1. A holder for cellular phones comprising:

a fixing plate fixed inside a phone case;

a holding plate attached outside said phone case at a position corresponding to said fixing plate, said holding being provided with a clip for clipping said phone case on a user's belt and having a multi-stage opening on a center position thereof;

a circular rotating button fixed outside said phone case and rotatably received in said multi-stage opening of the holding plate;

a coupling pin adapted for coupling said fixing plate, phone case, holding plate and circular rotating button together in a way such that said rotating button along with said phone case is rotatable relative to said holding plate provided with the clip and means for limiting the rotating angle of said rotating button relative to said holding plate thereby limiting the rotating angle of said phone case relative to the holding plate provided with the clip, said means for limiting the rotating angle comprising an arcuate guide notch formed on said circular rotating button by partially cutting out the edge of the button, opposite ends of said guide notch forming stop shoulders, and a radial protrusion radially extending inward from the edge of said multi-stage opening of the holding plate, said protrusion being received in said arcuate guide notch of the button and stopping the stop shoulders of the guide notch when said button is rotated inside the multi-stage opening.

2. The holder according to claim 1, further comprising:

a stop end formed on said clip by bending a lower end of said clip toward said phone case; and a slot formed on a lower edge of said holder at a position corresponding to said stop end of the clip and adapted for receiving said stop end of the clip.

* * * * *